United States Patent [19]

Bartholmey et al.

[11] 4,420,949

[45] Dec. 20, 1983

[54] SEAWATER ICE MAKING APPARATUS

[75] Inventors: Don S. Bartholmey, Bellevue; Ronald D. Babcock; George L. Weisel, both of Seattle, all of Wash.

[73] Assignee: North star Ice Equipment Corporation, Seattle, Wash.

[21] Appl. No.: 391,460

[22] Filed: Jun. 23, 1982

[51] Int. Cl.³ .............................................. F25C 1/14
[52] U.S. Cl. ....................................... 62/354; 165/91; 165/94
[58] Field of Search ................... 62/353, 354, 123, 35; 165/91, 92, 94

[56] References Cited

U.S. PATENT DOCUMENTS

| | | |
|---|---|---|
| 2,272,715 | 2/1942 | Lindsey . |
| 2,575,374 | 11/1951 | Walsh . |
| 2,585,020 | 2/1952 | Lessard et al. . |
| 2,585,021 | 2/1952 | Lessard et al. . |
| 2,659,212 | 11/1953 | Lees . |
| 2,671,646 | 3/1954 | Lindsey . |
| 2,683,357 | 7/1954 | Albright . |
| 2,712,734 | 7/1955 | Lees . |
| 2,713,474 | 7/1955 | Read . |
| 2,716,869 | 9/1955 | Lees . |
| 2,735,275 | 2/1956 | Branchflower . |
| 2,779,167 | 1/1957 | Lo Faro . |
| 2,836,967 | 6/1958 | Kocher . |
| 2,860,490 | 11/1958 | Taylor . |
| 2,910,841 | 11/1959 | Branchflower . |
| 2,919,561 | 1/1960 | Lees . |
| 3,029,615 | 4/1962 | Lindsey . |
| 3,403,532 | 10/1968 | Knowles . |
| 3,848,289 | 11/1974 | Bachmann . |
| 4,075,868 | 2/1978 | Bartholmey . |

Primary Examiner—Ronald C. Capossela
Attorney, Agent, or Firm—Christensen, O'Connor, Johnson & Kindness

[57] ABSTRACT

A plurality of knives (100) carried by driven means (36) to travel in circular paths along an inside, cylindrical freezing surface (16) of a refrigerated double-walled drum (12) to remove salt water ice formed thereon. A substantially flat lower surface (122) extends along the bottom of a knife leading section (106) and a substantially flat lower surface (124) extends along the bottom of a knife trailing section (108). In a direction transversely to the length of knife (100), the leading and trailing lower surfaces (122, 124) are disposed substantially normal to the drum freezing surface (16), and in the direction extending rearwardly along the length of knife (100), the leading lower surface (122) is inclined slightly downwardly from the horizontal while the trailing lower surface (124) is inclined downwardly at an angle substantially greater than the angle of inclination of the lower leading surface (122). A thin ice engaging outer edge (112) extends along the radially outward portion portions of the knife leading and trailing lower surfaces (122, 124) in a continuous arc closely corresponding to the circumference of the drum freezing surface (16).

21 Claims, 7 Drawing Figures

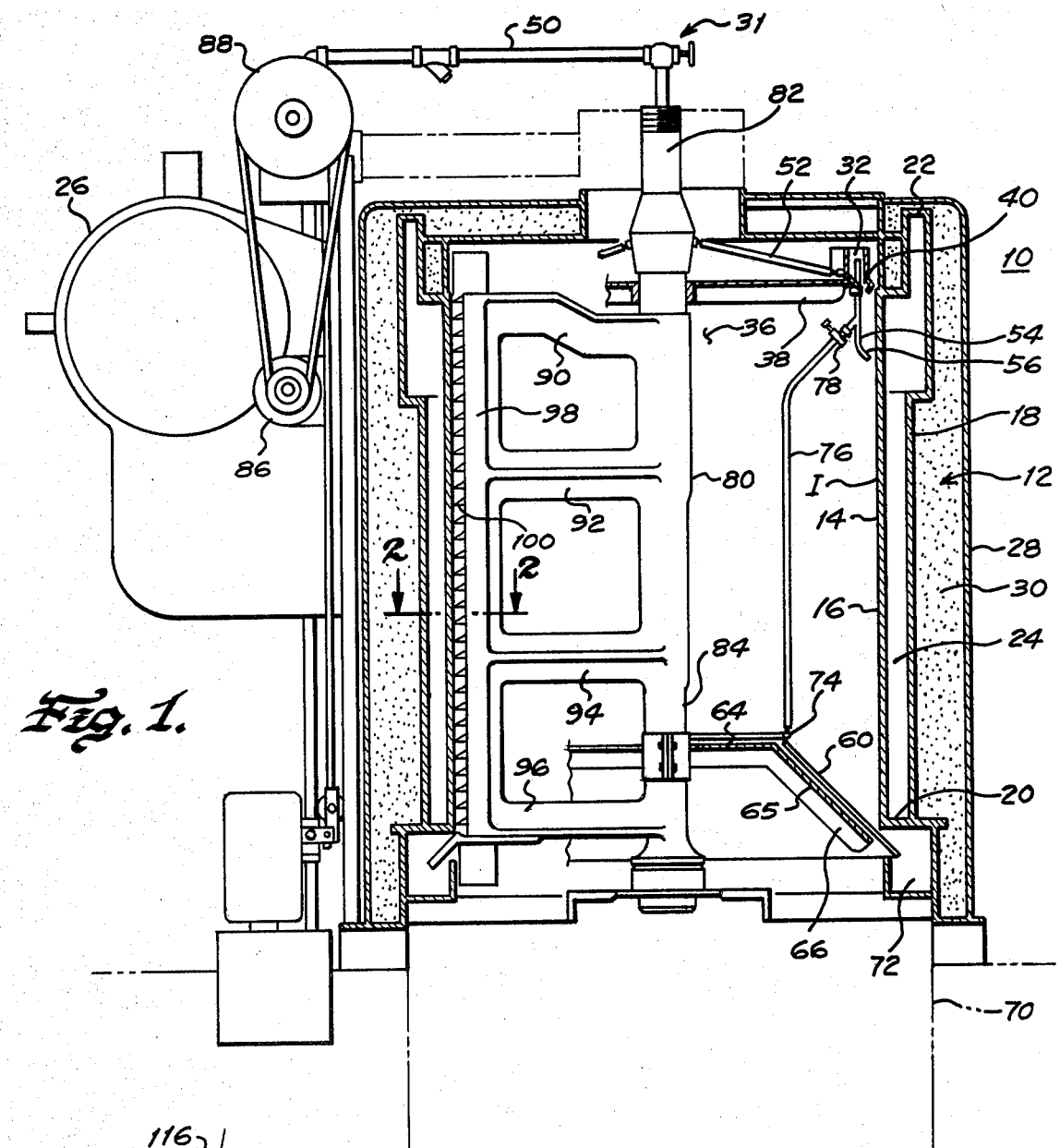
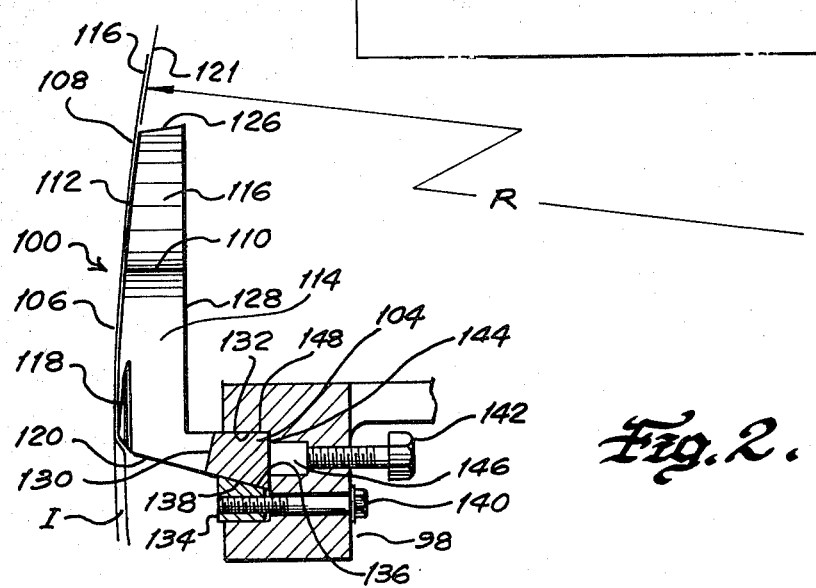
Fig. 1.
Fig. 2.

SEAWATER ICE MAKING APPARATUS

DESCRIPTION

1. Technical Field

The present invention relates to ice making apparatus, and more particularly to an apparatus for making ice from seawater.

2. Background Art

Various types of machines have been developed for making ice from fresh water. They typically include an upright vertical cylindrical drum having a polished inside freezing surface which is cooled by circulating refrigerant around the drum. Fresh water is applied to the inside diameter of the cylinder to form ice thereon. The ice is removed from the drum in the form of flakes or chips by a plurality of knives mounted on a powered support arm which rotates within the cylinder to sweep the knives in circular paths around the inside of the drum. An ice bin or a collector is located beneath the cylinder to catch the falling ice which is removed from the freezing surface. Examples of such ice making machines are disclosed by U.S. Pat. Nos. 2,659,212; 2,683,357; 2,712,734; 2,716,869; 2,735,275; 2,836,967; 2,910,841; and 4,075,868.

In each of the above-noted patents, the knives are shaped in the form of substantially straight, elongate, rectangular members having outer cutting edges which slice into the ice formed on the inside diameter of the drum. In the '212, '869, '275, '841 and '868 patents, the outer cutting edges of the knives are disposed at an angle to a plane normal to the vertical axis of the drum freezing surface, i.e. sloped downwardly from the front to the rear of the knife. The sloped cutting edges of the knives impose a downward force on the scored ice to loosen it from the inside diameter of the drum and cause it to fall downwardly into the ice bin. The brittleness of the fresh water ice causes it to fracture into flakes or chips as it is sheared away from the drum. In the '734 patent, the leading portion of the knife outer edge is relatively thin to enable the knife to score the ice. The thickness of the outer edge increases toward the trailing edge of the knife. As the knife moves along the inside diameter of the drum, the forward leading edge scores the ice and then the trailing portion of the knife edge compresses the ice to thereby dislodge it from the inside diameter of the drum. Again, the brittleness of the fresh water ice enables it to be fractured into flakes under the compression load imposed by the knives.

Applicants have found, however, that ice making machines designed for use with fresh water do not satisfactorily produce ice from seawater or other types of salt water. Seawater freezes at a lower temperature than fresh water, and thus at a temperature when fresh water is completely frozen, seawater is still in a partially frozen state, having a slurry-like composition. The slurry has a high surface tension, causing it to adhere to the freezing surface of the ice making machine rather than tending to peel away from the drum in the manner of fresh water ice. As a consequence, the knives simply tend to cut grooves in the ice instead of removing the ice from the freezing surface. Even if, by chance, the salt water ice was removed from the freezing surface by the knives of the fresh water machine, the salt water ice would build up on the blades and eventually wedge between the knives and the drum and even between the blade support arm and the drum, thereby imposing a significant drag on the knives. Not infrequently, the high drag force slows and eventually locks the knives to the drum causing the motor, which powers the support arm, to stall. To prevent this from happening, the rotating support arm would have to be stopped periodically and the inside of the drum flushed out. This is a burdensome, time-consuming operation which significantly reduces the production capacity of the ice maker.

As a consequence, it is a primary object of the present invention to provide an ice maker which includes knives which cleanly and efficiently remove seawater ice from the inside surface of the drum, and which knives are self-cleaning to prevent buildup of the ice on the knives, thereby leading to the efficient production of seawater ice.

DISCLOSURE OF THE INVENTION

The salt water ice making apparatus of the present invention includes a substantially vertical drum with the inside diameter of the drum forming an inner freezing surface which is cooled by liquid refrigerant circulated around the drum. Salt water is applied to the freezing surface to form a thin sheet of ice thereon. The ice is removed from the freezing surface by a series of knives mounted on a vertical knife rail in close proximity to the drum freezing surface. The knife rail in turn is rotated about the interior of the drum by a powered rotor assembly to carry the knives in circular paths around the freezing surface.

Each knife includes an elongate leading section extending rearwardly and slightly downwardly from the knife rail and an elongate trailing section extending rearwardly and downwardly from the leading section at a steeper angle than the angle of inclination of the leading section. A substantially flat, lower surface extends along the bottom of the knife leading section, and a substantially flat lower surface also extends along the bottom of the knife trailing section. The leading and trailing lower surfaces of the knife, in the direction transverse to the length of the knife, are disposed substantially normal to the drum freezing surface. However, in the direction extending rearwardly along the length of the knife, the knife leading lower surface is inclined slightly downwardly and the trailing lower surface is also inclined downwardly in the rearward direction, but at an angle which is substantially greater than the angle of inclination of the leading lower surface. An ice engaging outer edge extends along the outer portions of the knife leading and trailing sections to form a continuous arc closely corresponding to the circumference of the drum freezing surface.

As the knives travel along the freezing surface, the outer edge cuts the ice on the freezing surface into bands and then the sloped leading lower surface, together with the knife outer edge, imposes a downward force on the ice to shear the ice away from the drum and cause the ice to slide along the length of the knife lower surface. The knife rearward section cooperates with the knife forward section to guide the band of ice along its lower surface rather than allowing the ice to build up on the leading section of the knife. The angle of inclination of the knife trailing section is sufficient to induce the band of ice to drop downwardly away from the knife as the ice slides past the extreme rear end of the knife.

The knife trailing section is long enough and its angle of inclination is steep enough so that at the rear end of the knife trailing section, the trailing lower surface is at an elevation below the elevation of the leading lower surface of the next lower adjacent knife. As a consequence, the knife outer edges jointly sweep the entire area of the drum freezing surface to remove substantially all of the ice therefrom.

A plurality of knives are joined together into an assembly or unit by an upright bar which interconnects the radially inwardly disposed edge portions of the leading sections of the knives. The portions of the upright bar which extend vertically between adjacent knives define a radially outer surface which faces the drum freezing surface. Preferably this radially outer surface of the bar is sufficiently relieved, i.e. disposed radially inwardly from the inner edges of the knives to allow ice collecting on the leading sections of the knives to pass freely rearwardly between the knives. Also, the bar outer surface is ideally beveled away from the drum freezing surface from the forward, leading face of the bar to the rearward trailing face of the bar. Beveling the bar outer surface in this manner also assists in allowing the ice removed from the freezing surface to pass rearwardly along the knife forward sections.

BRIEF DESCRIPTION OF THE DRAWINGS

The details of typical embodiments of the present invention will be described in connection with the accompanying drawings, in which:

FIG. 1 is a sectional elevation view on the diameter of an ice making apparatus constructed according to the present invention;

FIG. 2 is a fragmentary, enlarged, cross-sectional view of the ice making apparatus shown in FIG. 1, taken substantially along lines 2—2 thereof to specifically illustrate the manner in which the ice removing knives are attached to the rotor assembly;

BEST MODE OF THE INVENTION

Figure 3:
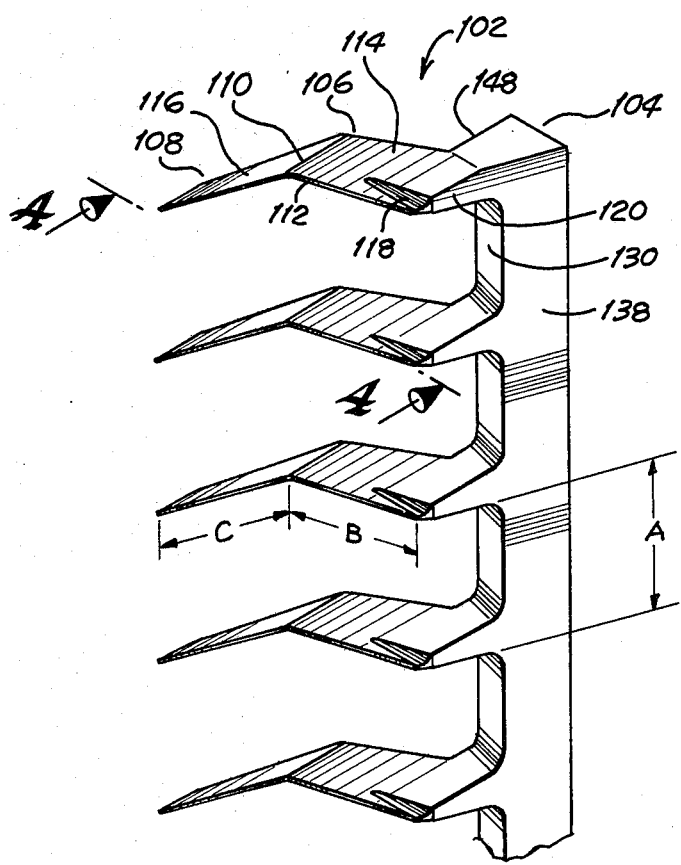
FIG. 3 is an enlarged isometric view of a knife unit utilized in the apparatus illustrated in FIG. 1.

Referring initially to FIG. 1, an ice making apparatus, generally designated 10, constructed according to the best mode of the present invention currently known to applicants, is shown as a double-walled vertical drum 12 including a stainless steel or carbon steel polished inner cylindrical freezing surface 16 on which is distributed salt water, such as seawater, from a distribution system 31. The salt water freezes to form a thin sheet of ice I. The ice is removed from freezing surface 16 by a series of sweeps or knives 100 mounted in spaced vertical relationship adjacent to freezing surface 16 on a vertical knife rail 98. The knife rail is rotated around the interior of drum 12 by a powered rotor assembly 36 having a vertical rotor shaft 80 aligned with the longitudinal central axis of drum 12. Knives 100 travel in circular paths along freezing surface 16 to remove ice I therefrom in individual ribbons. The ribbons of ice are collected within a storage bin 70 disposed below drum 12.

In the description of applicants' invention described in greater detail below and in the appended claims, the terms "forward" or "leading" are made with reference to the rotational direction of knives relative to drum 12. The same holds true for the terms "rearward" or "trailing". The terms "inner" and "inward" and the terms "outer" and "outward" are used with reference to the radial direction from the longitudinal axis of drum 12 about which knives 100 rotate.

Continuing to refer to FIG. 1, drum 12 includes an inner wall 14 which defines a cylindrical freezing surface 16 forming the inside diameter of inner wall 14. Drum 12 also includes an outer wall 18 disposed concentric with and spaced outwardly from inner wall 14. The lower edges of inner and outer walls 14 and 18 are interconnected by a bottom end closure annulus 20 and the upper edges of the inner and outer walls are interconnected with a top closure annulus 22 to form a refrigerant chamber 24. Standard refrigerants, such as Freon, ammonia, ethylene glycol or salt brine, may be circulated through refrigerant chamber 24 to thereby cool drum freezing surface 16. An outer cover 28 is spaced concentrically with and outwardly from outer wall 18. Outer cover 28 includes a vertical cylindrical portion which encases the outer shell and a circular horizontal top portion which covers the top of apparatus 10. The space between outer cover 28 and outer wall 18 is filled with thermal insulation 30. Insulation (not shown) also surrounds the accumulator 26.

A distributing ring 32 of a water distribution system 31 is mounted on the top section 82 of a rotor assembly 36 to rotate with the rotor assembly. Distributing ring 32 is formed in a diameter slightly smaller than the diameter of drum inner wall 14 and is positioned concentrically to freezing surface 16 by a plurality of ring arms 38 secured to and extending radially outwardly from rotor top section 82. The water distributing ring is hollow, generally U-shaped in cross section, and includes around its outer lower edge a series of nozzles or orifices 40 spaced around the circumference of the distributing ring. Nozzles 40 are positioned to direct streams of salt water in the direction of rotation of ring 32 and onto the top portion of freezing surface 16. Directing salt water against freezing surface 16 in this manner allows the salt water to spread downwardly over the entire freezing surface without channeling. Ring 32 is divided into arcuately equal sections, each section being separated by a divider, not shown. An open section is provided in ring 32 adjacent knife rail 98 to allow the ice time to dry and be removed by knives 100.

Salt water is introduced into the hollow top section 82 of rotor assembly 80 by supply pipe 50 and then is distributed to each section of ring 32 through individual tubes 52. A vertical overflow tube 54 extends upwardly into each section of ring 32 with the top of overflow tube 54 being at a fixed distance above nozzle 40. Each overflow tube 54 has a canted lower outlet portion 56 directed diagonally downwardly and radially outwardly toward freezing surface 16. Overflow water from ring 32 passes through tubes 54, out lower portion 56 and onto the upper portion of the freezing surface.

Preferably apparatus 10 includes generally frustro conically-shaped drip shield 60 mounted on the lower portion 84 of shaft 80. Drip shield 60 is supported by a plurality of dog-leg shaped ring arms 64 having a horizontal upper portion extending radially outwardly from shaft lower portion 84 and a lower diagonal portion 65 underlying drip shield 60. The drip shield serves as a deflector for drops of salt water dripping from inner freezing surface 16. Insulating material 66 is mounted on the bottom of shield 60 to partially counter the tendency of the very cold air moving up from an ice storage bin 70 to lower the temperature of shield 60 such that ice forms thereon. Drip shield 60 extends circumferentially outwardly beyond inner freezing surface 16, and has a segment removed therefrom adjacent knife rail 98 to allow ice removed from the inner freezing surface 16 by knives 100 to fall therethrough and downwardly into bin 70. The arcuate opening in drip shield 60 is substantially equal in arc length to the opening provided in water ring 32 discussed above. The lower outward rim portion of shield 60 extends within an opening formed in the upper proportion of a fixed, circular water receiving pan 72 to direct water from the shield into the pan.

An annular spray tube 74 is mounted on the top of drip shield 60 by any convenient means, not shown. A plurality of small orifices are spaced along the circumferential length of spray tube 74 to spray salt water onto the drip shield continually during the operation of apparatus 10. Spray tube 74 is fed by a series of downwardly extending tubes 76 having their upper ends in water flow communication with distributor ring 32. Preferably tubes 76 are formed from flexible material and the flow of water downwardly through the tubes controlled by pinch clamps 78 which are commonly available. Drip shield 60 directs all excess water flowing off of the inner freezing surface 16, as well as any drippage or overflow from the water distributing ring 32, into receiving pan 72 so that no water falls into the ice storage bin 70. Also, the continuous water wash provided by spray tube 74 keeps ice from forming on drip shield 60 or in water receiving pan 72 thereby preventing ice from clogging apparatus 10 and causing water to overflow into the ice receiving bin 70. It is to be understood that drip shield 60 and spray tube 74 are known in the art and do not form a part of the present invention.

Rotor assembly 36, as illustrated in FIG. 1, includes an upright, central shaft 80 having a hollow upper section 82 and a bottom section 84 rotatably journaled relative to drum 12 by appropriate means. Rotor assembly 36 is driven by a motor 86 mounted adjacent to drum 12. Motor 86 is connected to a suitable drive unit 88 which transmits the output of motor 86 into the rotation of rotor assembly 36. A plurality of spaced apart, aligned arms 90, 92, 94 and 96 extend radially outwardly from rotor shaft 80 to support a vertical knife rail 98, FIG. 2, which extends in close proximity from substantially the top edge to the lower edge of freezing surface 16. Knife rail 98 supports a plurality of vertically spaced apart knives, individually designated as 100, in close proximity to freezing surface 16 to travel in circular paths along the freezing surface to remove ice I therefrom.

Referring additionally to FIGS. 2-6, a series of knives 100 are attached together as a unit 102 by a transverse, vertical bar 104, and a plurality of units 102 are in turn secured to knife rail 98, as discussed more fully below. Each knife 100 includes an elongate forward section 106 extending rearwardly away from bar 104 at a slightly downward angular slope X from the horizontal and an elongate rearward or trailing section 108 intersecting forward section 106 at juncture 110. Knife rear section 108 extends rearwardly from forward section 106 and is canted downwardly at a steeper angle Y relative to the horizontal than the angle X at which the forward section is sloped relative to the horizontal.

Figure 5:
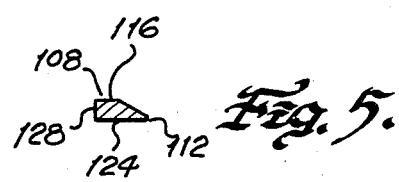
FIG. 5 is an enlarged cross-sectional view of the knife trailing section illustrated in FIG. 4 taken substantially along lines 5—5 thereof.
Figure 6:
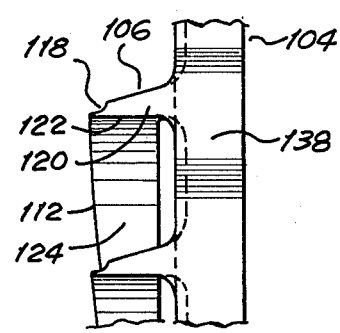
FIG. 6 is an enlarged, front view of one of the knives illustrated in FIG. 3.

As best shown in FIGS. 3, 5 and 6, each knife 100 includes a thin ice engaging radially outer edge 112 which is formed by beveling the upper or top surfaces 114 and 116 of knife forward and rearward sections 106 and 108, respectively. An arcuate groove 118 extends along the forward portion of each knife forward section 106 at the intersection of outer edge 112 and top surface 114. As a result, a portion of knife radially outer edge 112 at the forward end 120 of knife 100 defines a relatively narrow tip or lead end portion for cleanly scoring ice I during the travel of knife 100 along drum freezing surface 16. Preferably in cross section groove 118 defines a quarter circle or quadrant. The groove extends horizontally rearwardly relative to knife forward section 106, and as a result the groove diminishes or tapers as it extends rearwardly along the knife until it terminates at a location between knife forward end 120 and juncture 110.

When viewing knife 100 in the plan or top view illustrated in FIG. 2, outer edge 112 defines a smooth arc 121 closely corresponding to the circumference of drum freezing surface 16. Preferably edge 112 is spaced slightly away from freezing surface 16 to avoid interference or actual contact with the freezing surface but close enough to the freezing surface to score and cut ice I.

Figure 4:
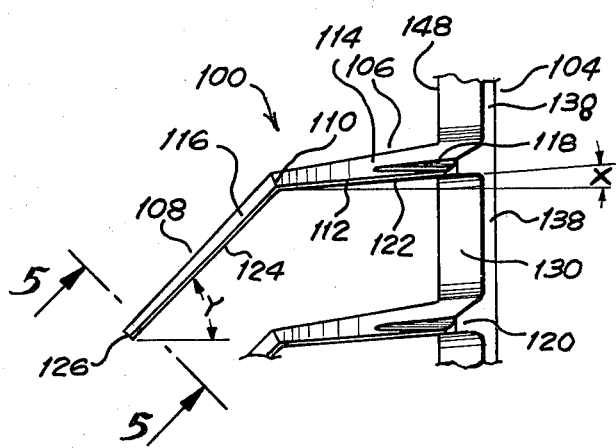
FIG. 4 is an enlarged plan view of one of the knives illustrated in FIG. 3.

As most clearly illustrated in FIGS. 3 and 4, knife leading section 106 includes a flat lower surface or face 122 and trailing section 108 includes a flat lower face or surface 124 intersecting the lower surface 122 at juncture 110. The outer edge 112 of the knife extends along the outer sides of lower surfaces 122 and 124. In the direction transversely to the length of knife 100, preferably lower surfaces 122 and 124 are disposed substantially normally to drum freezing surface 16. However, in the longitudinal direction, as discussed above relative to outer edge 112, leading lower surface 122 is disposed at a slight downward rake or angle X relative to a plane disposed normally to the vertical central axis of drum surface 16. Correspondingly, trailing lower surface 124 is disposed at a steeper rake or angle Y than the angle of inclination of X of leading lower surface 122 to define an obtuse angle between the leading and trailing lower surfaces. The extreme rear end 126 of knife trailing section 108 overlaps the leading lower surface 122 of the next lower knife 100.

By orientating leading lower surface 122 at an angle X, the leading lower surface, together with knife outer edge 112, impose a downward force on ice I to shear the ice away from drum freezing surface 16 as knife 100 travels along the freezing surface. Because seawater does not completely freeze at the normal operating temperature of apparatus 10, the ice formed on freezing surface 16 is not totally solid, but rather has a slurry-like composition which tends to adhere through surface tension rather strongly to the drum freezing surface and knife 100 rather than fracturing into flakes or chips in the manner of fresh water ice. If conventional knives, such as those of the type discussed above in the "Background Art" section of the present application, are utilized, the tools simply cut grooves in the ice without actually removing the ice from the drum, or, if the ice is dislodged from the drum, it builds up on the knives. The buildup might be so extensive that the ice becomes lodged between the knives and the freezing surface and between the knife bar, such as bar 104, and the freezing surface thereby imposing a very large drag force on rotor assembly 36. Eventually motor 86 may stall or apparatus 10 may otherwise break down.

However, by forming knives 100 with trailing section 108 having a sharp outer edge 112 and a flat bottom surface 116 sloped at a rather sharp downward angle Y, the salt water ice initially removed from freezing surface 16 by knife forward section 106 continues to slide along trailing lower surface 124 in a continuous ribbon. The angle of inclination of trailing section 108 is sufficient to induce the ice ribbon to drop downwardly away from the knife as the ice slides past the extreme rear end 126 of the knife. Thus, rather than inducing the buildup of ice on knives 100, the unique configuration of applicants' knives enables them to be self-cleaning. Also, by overlapping the end 126 of each knife trailing section 108 with the path traveled by the outer edge of the forward section 106 of the next lower knife, knives 100 sweep the entire area of freezing surface 16 to remove all of ice I from the freezing surface.

Referring specifically to FIGS. 2, 3 and 5, each knife 100 has a radially inner edge 128 which preferably is disposed vertically for the full length of the knife. The forward portion of inner edge 128 (at knife leading end 120) intersects with the adjacent outer surface 130 of bar 104. As most clearly illustrated in FIG. 2, bar 104 is retained within a slot 132 formed along the radially outer portion of knife rail 98 by a keeper bar 134, also disposed within slot 132. Keeper bar 134 is formed with a diagonal face 136 which presses against a corresponding diagonal face 138 of bar 104 by a plurality of capscrews 140 extending through clearance holes formed in knife rail 108 to engage within threaded holes formed in the keeper bar to thereby securely wedge bar 104 within slot 132. Ideally the radially outer edges 112 of knives 100 are spaced very closely from freezing surface 16 by adjusting capscrews 142 which engage within threaded openings formed in knife rail 98 to push against the inside surface 144 of bar 104 through the intermediacy of a circular spacer 146 which is disposed within a close fitting counterbore formed in the knife rail. It will be appreciated that capscrews 142 may be adjusted to achieve the desired clearance between freezing surface 16 and knife outer edge 112, and then capscrews 140 tightened to lock knives 100 in such position.

The portions of knife bar radially outer surface 130 extending between adjacent knives 100 is relieved to a location radially inwardly of knife inner edge 128 to allow ice collecting against the forward ends 120 of knives 100 to pass, freely rearwardly between the knives to thereby reduce the buildup of ice around the knives. Also, bar radially outer surface 130 is beveled away from freezing surface 16 from the forward, leading face 138 to the rearward, trailing face 148 of bar 104. As a result, ice I freely slides rearwardly along bar outer surface 130. Applicants have found that if bar outer surface 130, instead, were disposed parallel to the adjacent inner edge 128 of knives 100, the seawater ice tends to wedge between bar surface 130 and freezing surface 16.

As a specific, but non-limiting example, applicants have found that if a freezing surface 16 is constructed with a radius R of 19 inches, one particular configuration of a knife unit 102 which efficiently removes the ice from this freezing surface includes knives 100 which are spaced along bar 104 apart from each other a distance A of approximately 2 inches. Preferably knife forward section 106 has a length B of about 2¼ inches and is sloped downwardly in a rearwardly direction at an angle X of approximately 5 degrees. The trailing section 108 of each knife 100 preferably has a length C of approximately 2½ inches and is sloped downwardly in its rearwardly direction at an angle Y of approximately 45 degrees. By forming knives 100 with these dimensions and positioning the knives at this relative spacing, knife rear end 126 overlaps the path of the adjacent underlying knife 100 so that knives 100 sweep the entire surface area of drum freezing surface 16. The knife outer edge 112 is curved at a radius approximating the radius of freezing surface 16. At the trailing side 148 of bar 104, bar outer surface 130 is spaced approximately 3/16 of an inch inwardly from the knife inner edge 128. Also, the bar outer surface 130 is beveled at an angle of approximately 5 degrees relative to the plane defined by knife inner edge 128. It is to be understood, of course, that freezing surface 16 can be constructed in other sizes and that the sizes and dimensions of the components may have to be accordingly altered from those set forth above.

Figure 7:
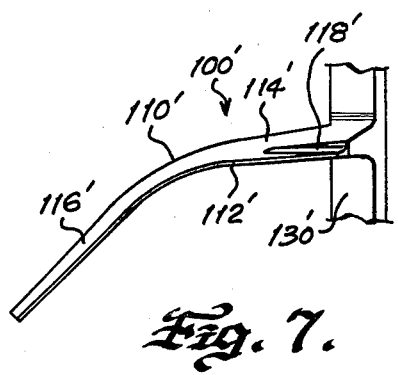
FIG. 7 is a view similar to FIG. 4 illustrating a knife constructed according to an alternative embodiment of the present invention.

An alternative embodiment of the present invention is shown in FIG. 7, which illustrates a knife 100' constructed essentially identically to knife 100 illustrated in FIGS. 2–6, with the exception that knife leading section 106' is interconnected with knife trailing section 108' by a smooth radius at juncture 110'. Forming knives 100' in this manner allows the knives to be conveniently manufactured, for instance by casting. Other than forming knife 100 with a smooth curve at juncture 110', knife 100' is constructed substantially identically to knife 100.

As will be apparent to those skilled in the art to which the invention is addressed, the present invention may be embodied in forms other than those specifically disclosed above without departing from the spirit or essential characteristics of the invention. The particular embodiment of apparatus 10 and knives 100 and 100', described above, are therefore to be considered in all respects as illustrative and not restrictive, i.e. the scope of the present invention is as set forth in the appended claims rather than being limited to the examples of apparatus 10 and knives 100 and 100', as set forth in the foregoing description.

What is claimed is:

1. In a salt water ice making machine having a freezing surface upon which ice is formed in a thin sheet, an improved knife for dislodging ice from the freezing surface and means for supporting and moving the knife along the freezing surface, said improved knife comprising:
   (a) an elongate leading section extending along said freezing surface and having:
      a leading cutting edge extending along the portion of said leading section disposed adjacent to said freezing surface in close proximity to said freezing surface; and
      a generally planar leading face surface disposed transversely to said freezing surface; and
   (b) an elongate trailing section angularly disposed relative to said leading section, said trailing section:
      having a trailing cutting edge extending along the portion of said trailing section disposed adjacent to said freezing surface in close proximity to said freezing surface to form a continuous cutting edge with the leading cutting edge; and
      a trailing face surface disposed at an obtuse angle relative to the leading face surface.

2. The improvement according to claim 1, wherein:
the cutting edge of said knife leading section is canted relative to the direction of travel of said knife leading section across the freezing surface; and
the cutting edge of said knife trailing section is canted at a greater angle relative to the direction of travel of said knife across said freezing surface than the angle at which said knife leading section is canted.

3. The improvement according to claim 1 or 2, wherein the freezing surface is composed of stainless steel.

4. The improvement according to claim 1 or 2, wherein the freezing surface is composed of carbon steel.

5. The improvement according to claim 1, further comprising:
transverse bar means securable to the support and moving means; and
a plurality of said knives extending rearwardly relative to the direction of travel of said support and moving means, said knives being disposed in alignment with each other and uniformly spaced apart along said bar means such that the trailing end of the cutting edge of each of said knives overlaps the paths of the leading section of the next adjacent knife.

6. The improvement according to claim 5, wherein:
each of said knives includes an inner edge extending along the portions of said knife leading and trailing sections opposite said leading and trailing outer cutting edges; and
the portions of said transverse bar extending between said knives defining a bar outer surface which is canted relative to said freezing surface to extend away from said freezing surface in the trailing direction of said knives.

7. An ice making apparatus for making ice from salt water, comprising:
(a) a vertical drum having an inner freezing surface;
(b) water supply means for depositing salt water on said drum freezing surface;
(c) cooling means for cooling said drum freezing surface to transform the salt water deposited on said freezing surface into ice;
(d) driven means at least partially disposed within and rotating relative to said drum; and
(e) a plurality of ice removing knives carried by said driven means, said knives being disposed generally parallel to each other and spaced apart along the height of said drum, each of said knives including:
an elongate leading section formed with a substantially flat lower surface extending along the bottom of said leading section, said leading lower surface in the direction extending transversely to the length of said knife leading section being disposed substantially normal to the drum freezing surface and in the direction extending along the length of said leading section being canted so that at the forward end of said leading section said leading lower surface being at a slightly higher elevation than at the rearward end of said knife leading section;
an elongate trailing section extending rearwardly and downwardly from the rearward end portion of said knife leading section, said knife trailing section having a substantially flat lower surface extending along the bottom of said knife trailing section, said trailing lower surface in the direction extending transversely to the length of said knife trailing section being disposed substantially normal to the drum freezing surface and in the direction extending along the length of said knife trailing section being canted so that the trailing lower surface at the forward end of the trailing section is at a substantially higher elevation than the elevation of said trailing lower surface at the rearward end of said trailing section; and
a thin, ice engaging outer edge extending along the radially outer side portions of the lower surfaces of said knife leading and trailing sections.

8. The ice making apparatus according to claim 7, wherein said knife outer edge extending along a continuous arc corresponding to the circumference of the drum freezing surface and being disposed in close proximity to the drum freezing surface.

9. The ice making apparatus according to claim 7 or 8, wherein at the rearward end of said knife trailing section said trailing lower surface being at an elevation lower than the elevation of the leading lower surface of the next lower adjacent knife.

10. The ice making apparatus according to claim 7, further comprising upright bar means interconnecting the forward portions of the leading sections of said plurality of knives, the portion of said bar means disposed between adjacent knives defining radially outer surfaces generally facing the drum freezing surface, said bar means outer surface having a leading edge in the direction of travel of said knives and a trailing edge opposite said leading edge, said bar means leading edge being disposed closer to said drum freezing surface than said bar trailing edge.

11. The ice making apparatus according to claim 10, wherein each of said knives having a radially inner edge extending along the sides of said leading and trailing lower surfaces opposite said outer edge, said knife inner edge being disposed radially closer to said drum freezing surface than the location of the outer surface of said upright bar means.

12. The ice making apparatus according to claim 7, wherein said inner freezing surface is composed of stainless steel.

13. The ice making apparatus according to claim 7, wherein said inner freezing surface is composed of carbon steel.

14. The ice making apparatus according to claim 7, further comprising an ice storage compartment disposed below said drum.

15. An apparatus for making ice from salt water, comprising:
(a) substantially vertical drum having an inner freezing surface;
(b) supply means for supplying salt water to the drum freezing surface;
(c) cooling means for cooling the drum freezing surface to transform the salt water supplied thereto into ice;
(d) driven means rotating within said drum; and
(e) a plurality of ice removing knives carried by said driven means to travel in circular paths around said drum freezing surface, each of said knives including:
(1) an elongate leading section and an elongate trailing section canted relative to said leading section;
(2) a substantially flat leading lower surface extending along the bottom of said knife leading section and a trailing lower surface extending along the bottom of said knife trailing section, said leading and trailing lower surfaces in the direction transverse to the length of said knife being disposed substantially normal to said drum freezing surface and in the direction extending rearwardly along the length of said knife, said leading lower surface being inclined downwardly and said trailing lower surface being inclined downwardly at an angle greater than the angle of inclination of said leading lower surface; and (3) a thin ice engaging outer edge extending along the radially outer portions of said leading and trailing lower surfaces in a continuous arc closely corresponding to the circumference of said drum freezing surface.

16. The salt water ice making apparatus according to claim 15, wherein:

each of said knives having an inner edge extending along the radially inner portions of said knife opposite said outer edge; and further comprising upright bar means transversely interconnecting the knife radially inner edges at the forward portion of said knife leading sections, the portions of said bar means extending transversely between said adjacent knives defining outer surfaces facing said drum freezing surface, said bar means outer surfaces being canted away from said drum freezing surface in the direction extending along the length of said knives.

17. The salt water ice making apparatus according to claim 16, wherein said knife inner edges being spaced radially outwardly toward said drum inner surface from the location of said bar means outer surfaces.

18. The salt water ice making apparatus according to claim 15, wherein at the rearward end of said knife trailing section said trailing lower surface being at an elevation below the elevation of at least a portion of the leading lower surface of the next lower adjacent knife.

19. The ice making apparatus according to claim 15, wherein said inner freezing surface is composed of stainless steel.

20. The ice making apparatus according to claim 15, wherein said inner freezing surface is composed of carbon steel.

21. The ice making apparatus according to claim 15, further comprising an ice storage compartment disposed below said drum.

* * * * *